US012800961B2

(12) United States Patent
Lo

(10) Patent No.: US 12,800,961 B2
(45) Date of Patent: Nov. 17, 2026

(54) DISPLAY DEVICE

(71) Applicant: CARUX TECHNOLOGY PTE. LTD., Aperia (SG)

(72) Inventor: Ching-I Lo, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 19/078,451

(22) Filed: Mar. 13, 2025

(65) Prior Publication Data

US 2025/0321448 A1 Oct. 16, 2025

(30) Foreign Application Priority Data

Apr. 15, 2024 (CN) ......................... 202410447894.2

(51) Int. Cl.
*G02F 1/13357* (2006.01)
*G02F 1/1335* (2006.01)

(52) U.S. Cl.
CPC .. *G02F 1/133608* (2013.01); *G02F 1/133603* (2013.01); *G02F 1/133606* (2013.01); *G02F 1/133612* (2021.01)

(58) Field of Classification Search
CPC ......... G02F 1/133608; G02F 1/133603; G02F 1/133606; G02F 1/133612
See application file for complete search history.

(56) References Cited

U.S. PATENT DOCUMENTS 9,104,064 B2 8/2015 Takeuchi
12,000,582 B2 * 6/2024 Oh ........................ F21V 7/0066
2017/0009960 A1 * 1/2017 Ahn .................. G02F 1/133608
2017/0192303 A1 * 7/2017 Kang ................ G02F 1/133608
2022/0206733 A1 6/2022 Hsiao
2022/0244585 A1 8/2022 Hsieh
2023/0040240 A1 2/2023 Hsiao
2023/0354521 A1 11/2023 Nien
2023/0365103 A1 11/2023 Hsiao
2023/0373306 A1 11/2023 Chang
2024/0021763 A1 * 1/2024 Nien .................... H10H 20/856
2024/0038185 A1 2/2024 Nien
2024/0200766 A1 6/2024 Sung
2024/0367594 A1 11/2024 Huang

FOREIGN PATENT DOCUMENTS

CN 103809315 B 9/2016
CN 115718544 A 2/2023
CN 115799225 A 3/2023
CN 117912386 A 4/2024

* cited by examiner

*Primary Examiner* — Evan P Dzierzynski
(74) *Attorney, Agent, or Firm* — JCIPRNET

(57) ABSTRACT

A display device is provided. The display device includes a display panel and a backlight module. The backlight module has a light-emitting region and provides a light source for the display panel. The backlight module includes a back plate, a plurality of light-emitting elements, an optical film, and a plurality of supporting pins. The plurality of light-emitting elements are disposed on the back plate and located in the light-emitting region. The optical film is disposed between the plurality of light-emitting elements and the display panel. The plurality of supporting pins support the optical film and are disposed along at least two sides of the back plate. The minimum distance between one of the plurality of supporting pins and the edge of the light-emitting region is less than 40 mm.

9 Claims, 12 Drawing Sheets

DISPLAY DEVICE

CROSS REFERENCE TO RELATED APPLICATIONS

This Application claims priority of China Patent Application No. 202410447894.2, filed on Apr. 15, 2024, the entirety of which is incorporated by reference herein.

BACKGROUND

Field of the Invention

The present invention relates to a display device, and, in particular, to a display device that includes supporting pins or supporting members.

Description of the Related Art

Due to the booming development of technology, the usage of electronic devices is becoming more and more popular nowadays. Among them, medium and large-sized display devices have gradually become favored by consumers. The diffusion plate or optical film in these medium and large-sized display devices needs to be supported, otherwise there is a risk of falling. Therefore, how to solve the above problem is an important issue.

BRIEF SUMMARY

An embodiment of the present invention provides a display device including a display panel and a backlight module. The backlight module has a light-emitting region and provides a light source for the display panel. The backlight module includes a back plate, a plurality of light-emitting elements, an optical film, and a plurality of supporting pins. The plurality of light-emitting elements are disposed on the back plate and are located in the light-emitting region. The optical film is disposed between the plurality of light-emitting elements and the display panel. The plurality of supporting pins support the optical film and are disposed along at least two sides of the back plate. The minimum distance between one of the plurality of supporting pins and the edge of the light-emitting region is less than 40 mm.

An embodiment of the present invention provides a display device including a display panel and a backlight module. The backlight module provides a light source for the display panel. The backlight module includes a back plate, a plurality of light-emitting elements, an optical film, and a supporting member. The back plate has a bottom surface and a sidewall perpendicular to the bottom surface. The plurality of light-emitting elements are disposed over the bottom surface of the back plate. The optical film is disposed between the plurality of light-emitting elements and the display panel. The supporting member is bonded to the sidewall of the back plate.

BRIEF DESCRIPTION OF THE DRAWINGS

The present invention can be more fully understood by reading the subsequent detailed description and examples with references made to the accompanying drawings, wherein.

DETAILED DESCRIPTION

Figure 1:
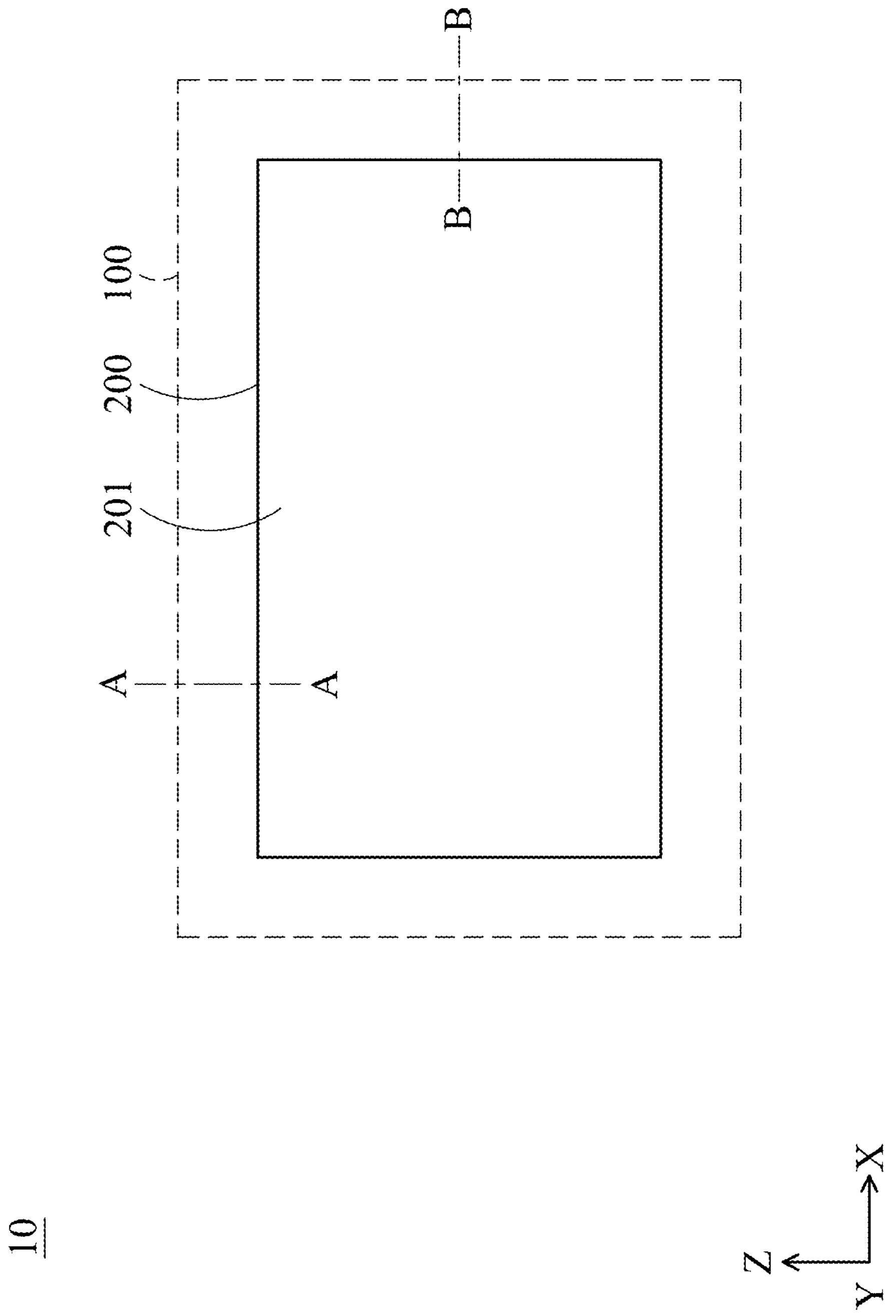
FIG. 1 shows a schematic top view of a display device in accordance with some embodiments of the present disclosure.

The present disclosure may be understood by referring to the following description and the appended drawings. It should be noted that, in order to make it easy for the reader to understand and to make the drawings concise, the drawings in the present disclosure may illustrate a part of the light-emitting unit, and specific elements in the drawings are not drawn based on the actual scale. In addition, the number and the size of each component in the drawings merely serves as an example, and are not intended to limit the scope of the present disclosure. Furthermore, similar and/or corresponding numerals may be used in different embodiments for describing some embodiments simply and clearly, but not represent any relationship between different embodiment and/or structures discussed below.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words "including", "comprising", "having" and the like are open words, so they should be interpreted as meaning "including but not limited to . . . ". Therefore, when terms "including", "comprising", and/or "having" are used in the description of the disclosure, the presence of corresponding features, regions, steps, operations and/or components is specified without excluding the presence of one or more other features, regions, steps, operations and/or components.

In addition, in this specification, relative expressions may be used. For example, “lower”, “bottom”, “higher” or “top” are used to describe the position of one element relative to another. It should be noted that if a device is flipped upside down, an element that is “lower” will become an element that is “higher”.

When a corresponding component (such as a film layer or region) is referred to as “on another component”, it may be directly on another component, or there may be other components in between. On the other hand, when a component is referred “directly on another component”, there is no component between the former two. In addition, when a component is referred “on another component”, the two components have an up-down relationship in the top view, and this component can be above or below the other component, and this up-down relationship depends on the orientation of the device.

It should be understood that, although the terms “first”, “second” etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as “first” and “second” may not be used in the description to distinguish different elements. As long as it does not depart from the scope defined by the appended claims, the first element and/or the second element described in the appended claims can be interpreted as any element that meets the description in the specification.

In the present disclosure, the thickness, length, and width can be measured by using an optical microscope, and the thickness can be measured by the cross-sectional image in the electron microscope, but it is not limited thereto. In addition, a certain error may be present in a comparison with any two values or directions. The terms “about,” “equal to,” “equivalent,” “the same,” “essentially” or “substantially” are generally interpreted as within 20% of a given value or range, or as interpreted as within 10%, 5%, 3%, 2%, 1%, or 0.5% of a given value or range. In addition, the term “electrically connected” may be used below. It should be understood that if the present disclosure recites “the first element is electrically connected to the second element,” it may be interpreted as that the first element and the second element are electrically connected to each other and may be synchronously controlled by a single operation, which may include the case “there may be other elements between the first element and the second element to electrically connect the former two,” or include “the first element and the second element are directly electrically connected without other elements.” When it is mentioned in the present disclosure that the first element is “directly electrically connected” to the second element, it may be taken to mean that “the first element and the second element are directly electrically connected without other elements.” In addition, the term “electrically insulated” may be used below. It should be understood that if the present disclosure recites “the first element and the second element are electrically insulated,” it may be interpreted as that the first element and the second element are electrically separated without being connected to each other, nor synchronously controlled by a single operation.

It should be noted that the technical solutions provided by different embodiments below may be interchangeable, combined or mixed to form another embodiment without departing from the spirit of the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

FIG. 1 shows a schematic top view of a display device 10 in accordance with some embodiments of the present disclosure. The display device 10 may include, for example, a backlight device, an antenna device, a sensing device or a splicing device, but the present disclosure is not limited thereto. The display device 10 may be a bendable or flexible electronic device. The display device may be a non-self-luminous display device or a self-luminous display device. The antenna device may be a liquid-crystal type antenna device or a non-liquid-crystal type antenna device. The sensing device may be a sensing device for sensing capacitance, light, thermal energy or ultrasonic waves, but the present disclosure is not limited thereto. In some embodiments, the display device 10 includes a flexible panel, the flexible panel includes electronic components, and the electronic components may include passive components and active components, such as capacitors, resistors, inductors, diodes, transistors, and the like. In some embodiments, the display device 10 may include, for example, a diode, a liquid-crystal, a light-emitting diode (LED), a quantum dot (QD), fluorescence, phosphorescence (phosphor), other suitable display media, or a combination thereof. In some embodiments, the diodes may include light-emitting diodes or photodiodes. The light-emitting diodes may, for example, include organic light-emitting diodes (OLEDs), mini LEDs, micro LEDs or quantum dot LEDs, but the present disclosure is not limited thereto. The splicing device may be, for example, a display splicing device or an antenna splicing device, but the present disclosure is not limited thereto. It should be noted that the display device 10 may be any combination of the above-mentioned devices, but the present disclosure is not limited thereto. In addition, the shape of the display device 10 may be rectangular, circular, polygonal, shapes with curved edges or other suitable shapes. The display device 10 may have peripheral systems such as drive systems, control systems, and light-source systems to support display devices, antenna devices, wearable devices (such as including augmented reality or virtual reality), vehicle-mounted devices (such as including car windshields), or splicing devices.

The following paragraphs will describe the content of the present disclosure with respect to the partial structure of the display device 10, but the present disclosure is not limited thereto. It should be understood by those skilled in the art that the display device 10 may also include other structures or be provided with suitable electronic components to perform the desired functions.

As shown in FIG. 1, the display device 10 may include a backlight module 100 and a display panel 200 that is located over the backlight module 100. This embodiment merely illustrates the approximate positions of the backlight module 100 and the display panel 200. The detailed structures of the backlight module 100 and the display panel 200 will be further discussed below. In some embodiments, the display panel 200 may have an active region 201. Specifically, the active region 201 may be a region on the display panel 200 that can be operated by users, but the present disclosure is not limited thereto. In some embodiments, the active region 201 may be a region on the display panel 200 that can display information to users (that is, users' visible region).

Figure 2:
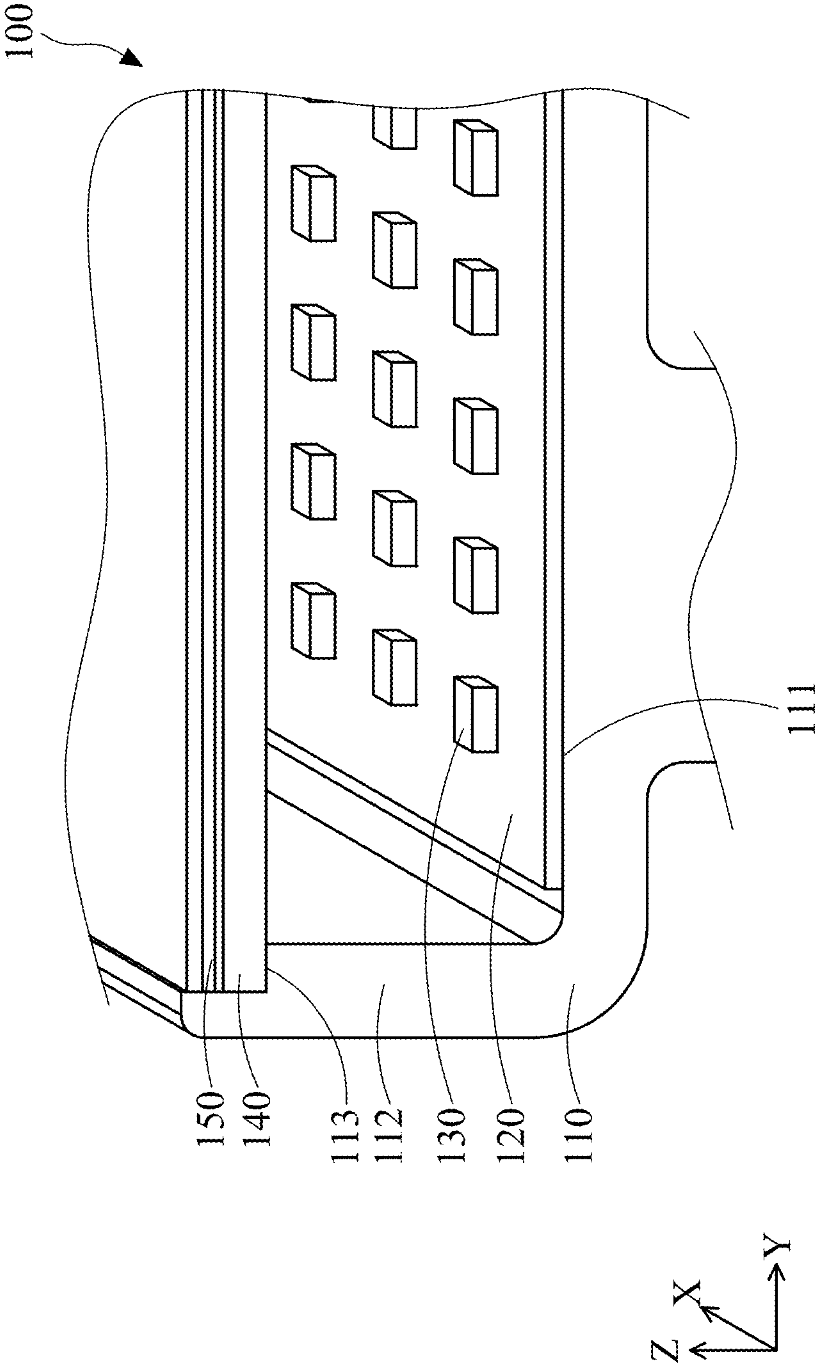
FIG. 2 shows a partial perspective view of the display device in accordance with some embodiments of the present disclosure.

FIG. 2 shows a partial perspective view of the display device 10 in accordance with some embodiments of the present disclosure. For example, FIG. 2 may be illustrated along the line A-A shown in FIG. 1, but the present disclosure is not limited thereto. It should be noted that in order to focus on the structure of the backlight module 100, this embodiment does not illustrate the display panel 200. In some embodiments, the backlight module 100 may include a back plate 110, a circuit substrate 120, a plurality of light-emitting elements 130, a diffusion plate 140, and at least one optical film 150. In some embodiments, the circuit substrate 120 is, for example, disposed on and supported by the back plate 110. In some embodiments, the circuit substrate 120 overlaps or corresponds to at least part of the back plate 110 in the normal direction (for example, substantially parallel to the Z-axis) of the display device 10. The light-emitting elements 130 are, for example, disposed on and electrically connected to the circuit substrate 120. As a result, the circuit substrate 120 may supply electrical power to the light-emitting elements 130, so that the light-emitting elements 130 can emit light to display information. In some embodiments, the light-emitting elements 130 may be light-emitting diodes (LED), including an organic light-emitting diodes (OLED), mini LEDs, micro LEDs or quantum dot LEDs, but the present disclosure is not limited thereto. In some embodiments, the circuit substrate 120 may be a printed circuit board (PCB), a flexible printed circuit (FPC), or the like, but the present disclosure is not limited thereto.

In some embodiments, the back plate 110 may have a bottom surface 111 and sidewalls 112 that are perpendicular to the bottom surface 111. In some embodiments, the circuit substrate 120 may rest on the bottom surface 111 of the back plate 110, and the light-emitting elements 130 are disposed over the bottom surface 111 of the back plate 110. In some embodiments, the sidewalls 112 of the back plate 110 may have a supporting portion 113 to support the diffusion plate 140, thereby reducing the risk of the diffusion plate 140 and the optical film 150 falling. In some embodiments, the optical film 150 may include, for example, a lower diffusion film, an upper diffusion film, a lower light-enhancing film, an upper light-enhancing film, or a prism sheet, but the present disclosure is not limited thereto. In some embodiments, the optical film 150 may include a reverse prism sheet, for example, which is used to gathering light, but the present disclosure is not limited thereto. In some embodiments, an adhesive member (not shown) may be disposed between the optical film 150 and the diffusion plate 140 so as to attach the optical film 150 to the diffusion plate 140 for reducing the procedures of assembly. However, the present disclosure is not limited thereto. For example, the structure of this embodiment can be applied to the upper and lower sides of the display device 10, but the present disclosure is not limited thereto.

Figure 3:
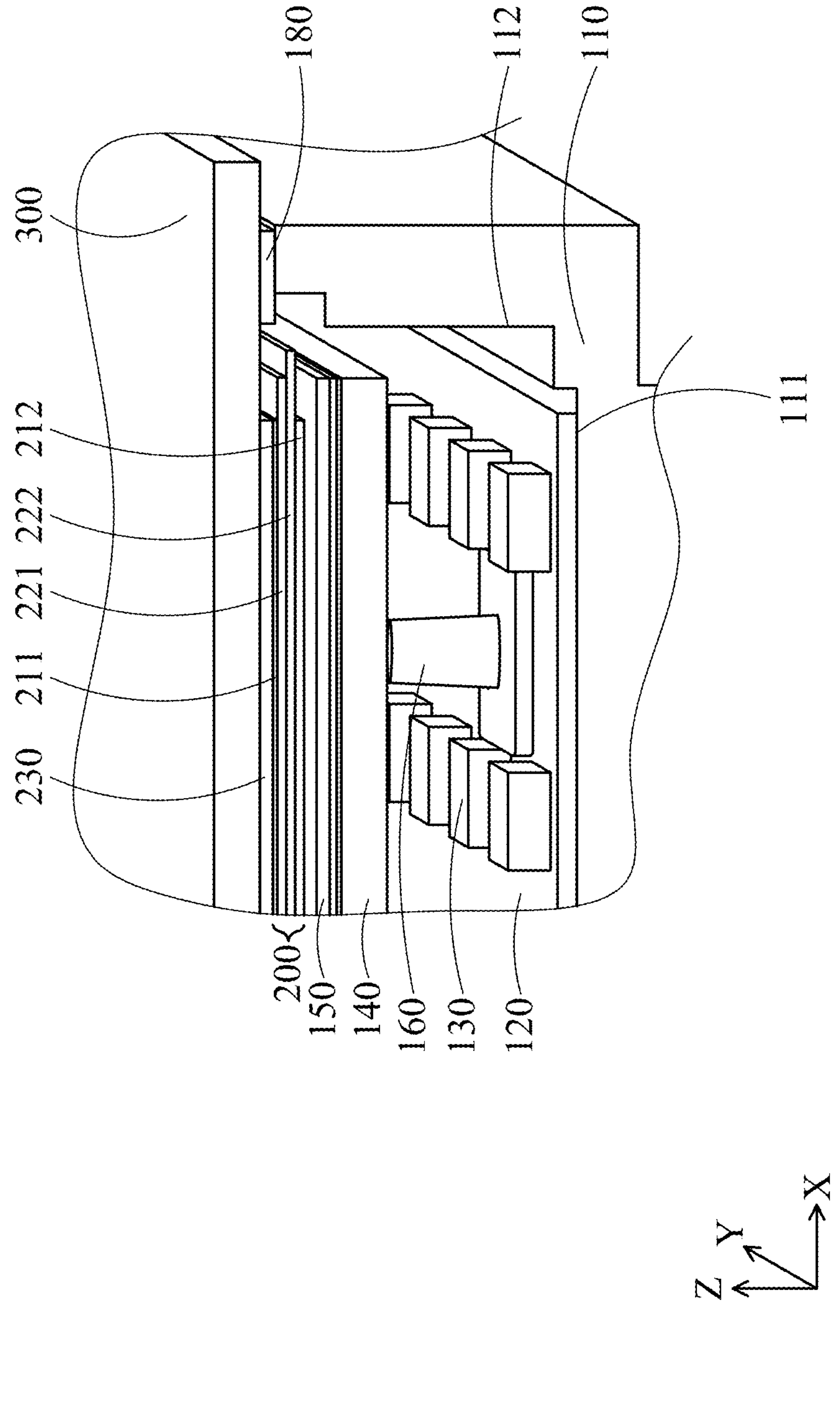
FIG. 3 shows a partial perspective view of the display device in accordance with some embodiments of the present disclosure.

FIG. 3 shows a partial perspective view of the display device 10 in accordance with some embodiments of the present disclosure. For example, FIG. 3 may be illustrated along the line B-B shown in FIG. 1, but the present disclosure is not limited thereto. As shown in FIG. 3, the backlight module 100 may include a supporting pin 160 that is disposed over the circuit substrate 120 and adjacent to the light emitting elements 130. The supporting pin 160 can be used to support the diffusion plate 140 and the optical film 150. In some embodiments, the supporting pin 160 may be in contact with the diffusion plate 140 (that is, the distance between the supporting pin 160 and the diffusion plate 140 is 0), but the present disclosure is not limited thereto. In some embodiments, the gap between the supporting pin 160 and the diffusion plate 140 may be no greater than about 1 millimeter. As a result, the risk of the diffusion plate 140 and the optical film 150 falling can be reduced. In some embodiments, the supporting pin 160 may be disposed between adjacent light emitting elements 130. For example, the cross-sectional area of the supporting pin 160 gradually decreases toward the diffusion plate 140, but the present disclosure is not limited thereto.

In some embodiments, the display panel 200 is disposed over the backlight module 100. In some embodiments, the display panel 200 includes a polarizing film 211, a polarizing film 212, an upper substrate 221 and a lower substrate 222, where the polarizing films 211 and 212 can be located on the upper and lower sides of the upper substrate 221 and the lower substrate 222. That is, the upper substrate 221 and the lower substrate 222 are located between the polarizing films 211 and 212. For example, the upper substrate 221 and/or the lower substrate 222 can be a flexible substrate or a rigid substrate, and the materials of the upper substrate 221 and the lower substrate 222 can include, for example, glass, sapphire, ceramics, plastic, or other suitable materials. The plastic material can be, for example, polyimide (PI), polyethylene terephthalate (PET), polycarbonate (PC), polyether oxime (PES), polybutylene terephthalate (PBT), polynaphthalene ethylene glycolate (PEN) or polyarylate (PAR), other suitable materials, or combinations thereof, but the present disclosure is not limited thereto. In some embodiments, the upper substrate 221 and the lower substrate 222 may be provided with a liquid crystal layer (not shown), and the liquid crystal layer may include nematic liquid crystal, smectic liquid crystal, cholesteric liquid crystal, blue phase liquid crystal or any other suitable liquid crystal material. It should be understood that although in this embodiment, two polarizing films 211 and 212 are shown respectively located on the upper and lower sides of the upper substrate 221 and the lower substrate 222, those skilled in the art should be able to adjust the number and positions of the polarizing films 211 and 212 as desired. In addition, the display device 10 may include a cover plate 300 that is bonded to the back plate 110 via an adhesive 180. As a result, the internal components of the display device 10 can be protected. An adhesive 230 may be disposed between the cover plate 300 and the display panel 200 for bonding the cover plate 300 and the display panel 200. In some embodiments, the adhesive 230 may be optical clear adhesive (OCA). For example, the structure of this embodiment can be applied to the left and right sides of the display device 10, but the present disclosure is not limited thereto.

Figure 4:
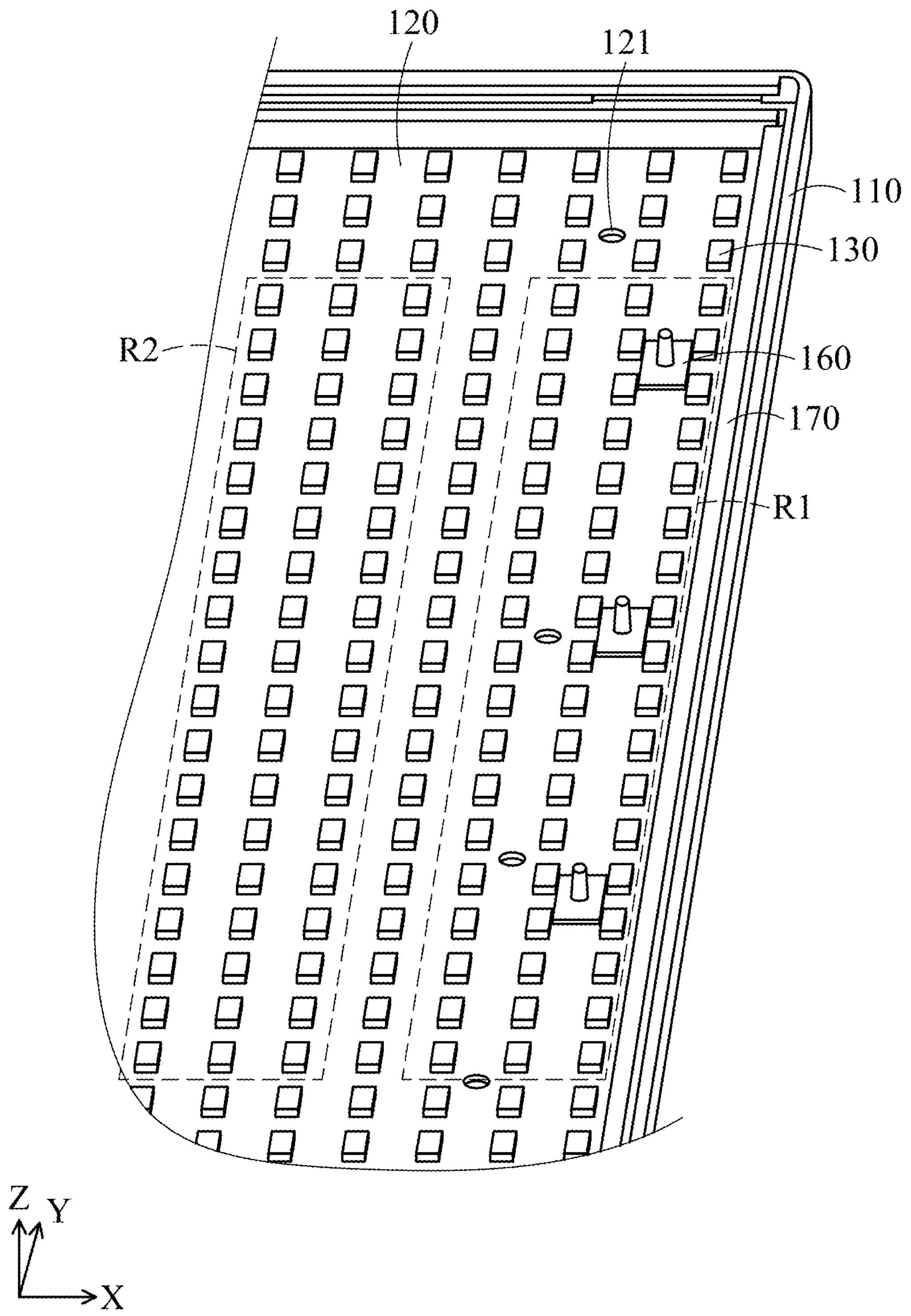
FIG. 4 shows a partial perspective view of the display device in accordance with some embodiments of the present disclosure.

FIG. 4 shows a partial perspective view of the display device 10 in accordance with some embodiments of the present disclosure. As shown in FIG. 4, the light-emitting elements 130 may be disposed on the circuit substrate 120 in an array. The backlight module 100 may have a light-emitting region. In some embodiments, the light-emitting region may be a region where the light-emitting elements 130 are disposed, but the present disclosure is not limited thereto. In some embodiments, the light-emitting region may be a region that light emitted by the light-emitting element 130 can reach. In some embodiments, the edge of the light-emitting region may be, for example, the edge of the circuit substrate 120. In some embodiments, the edge of the light-emitting region may be, for example, the edge of the bottom surface 111. As shown in FIG. 4, in some embodiments, one row of light-emitting elements 130 are disposed between the supporting pins 160 and the edge of the light-emitting region, wherein the aforementioned "row" may be referred to as multiple light-emitting elements 130 arranged along the Y-axis. In some embodiments, one to five rows of light-emitting elements 130 are disposed between the supporting pins 160 and the edge of the light-emitting region. In some embodiments, two to five rows of light-emitting elements 130 are disposed between the supporting pins 160 and the edge of the light-emitting region. In some embodiments, in the extending direction of the light-emitting region, the ratio of the distance between the supporting pins 160 and the edge of the light-emitting region to the length of the light-emitting region is greater than or equal to 1/30 and less than or equal to 1/10. In some embodiments, the minimum distance between one of the supporting pins 160 and the edge of the light-emitting region is less than or equal to 40 mm and greater than or equal to 10 mm. In this way, the supporting pins 160 can effectively support the edge of the diffusion plate 140 and reduce the risk of the diffusion plate 140 and the optical film 150 falling. For example, the above-mentioned minimum distance is measured between the center of the supporting pin 160 and the edge of the light-emitting region, but the present disclosure is not limited thereto. In some embodiments, the back plate 110 includes a first region R1 provided with the supporting pins 160 and a second region R2 located at the center of the back plate 110, wherein the supporting pins 160 are not located in the second region R2. In some embodiments, the density of the light-emitting elements 130 in the first region R1 may be equal to the density of the light-emitting elements 130 in the second region R2. However, the present disclosure is not limited thereto. In some embodiments, the density of the light-emitting elements 130 in the first region R1 may be different from (for example, smaller than) the density of the light-emitting elements 130 in the second region R2. Regarding the measurement of the density of the light-emitting elements 130, in some embodiments, it can be referred to as the number of the light-emitting elements 130 included in the same area, for example. The greater the number, the greater the density. In some embodiments, for example, the number of the same light-emitting elements 130 can be taken, and the area surrounded by these light-emitting elements 130 in the top view can be measured. The smaller the area surrounded, the greater the density.

In some embodiments, a plurality of holes 121 may be disposed in the circuit substrate 120 and located between adjacent light-emitting elements 130. For example, the holes 121 may be used to receive the supporting pins 160, and will be further discussed below with reference to FIG. 6. In some embodiments, the hole 121 may facilitate positioning the light emitting elements 130. In addition, the backlight module 100 may include a supporting member 170 that is disposed on the sidewall of the back plate 110. In some embodiments, the supporting member 170 may be used to support the edges of the diffusion plate 140 and the optical film 150. Furthermore, in some embodiments, the support 170 may be made of light-shielding material. As a result, the supporting member 170 can block the light emitted beside the diffusion plate 140, thereby reducing the risk of mura issues in the display device 10. For example, the structure of this embodiment can be applied to the left and right sides of the display device 10, but the present disclosure is not limited thereto.

Figure 5:
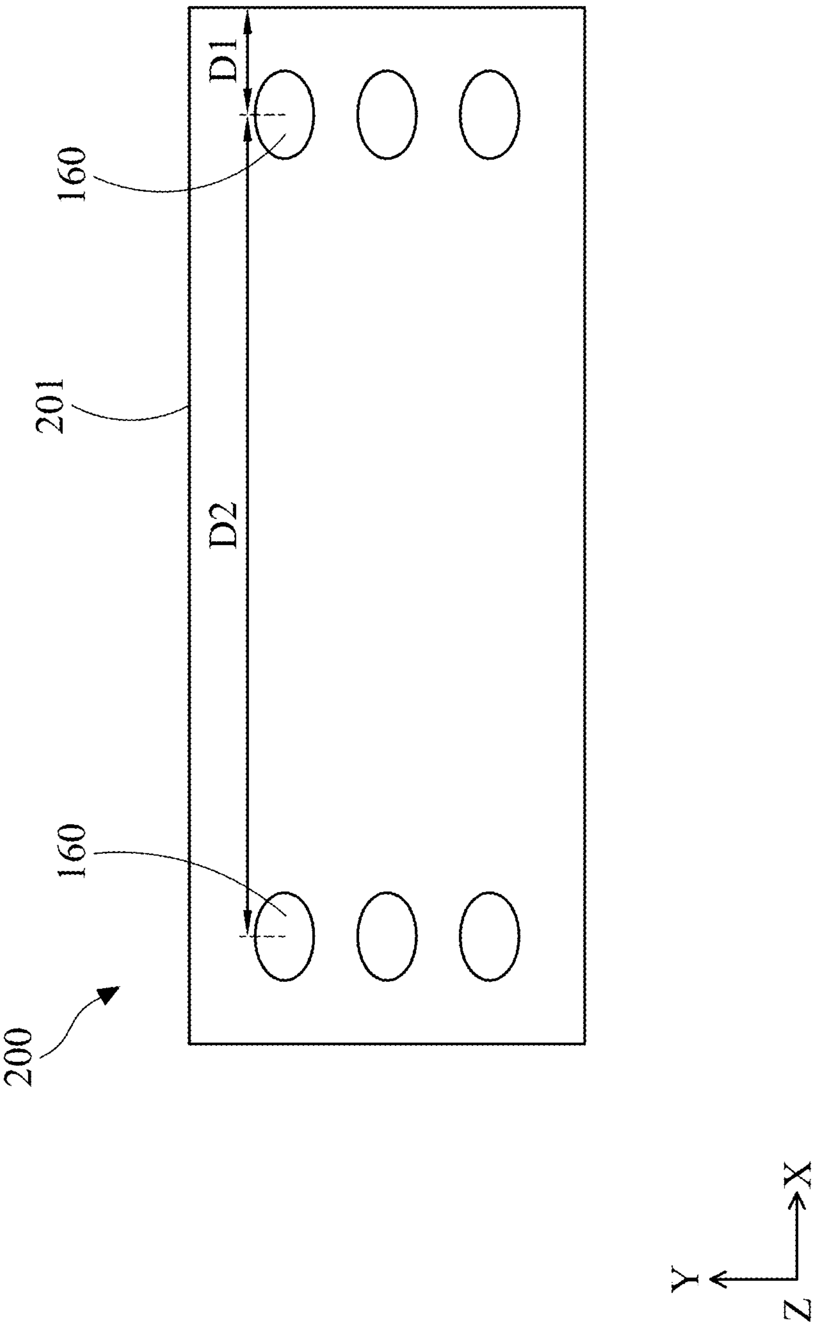
FIG. 5 shows a schematic top view of the display panel in accordance with some embodiments of the present disclosure.

FIG. 5 shows a schematic top view of the display panel 200 in accordance with some embodiments of the present disclosure. As shown in FIG. 5, the distance D1 between one of the supporting pins 160 and the edge of the active region 201 of the display panel 200 is less than 40 mm. For example, the distance D1 is the minimum distance measured between the center of the supporting pin 160 and the edge of the active region 201, but the present disclosure is not limited thereto. In some embodiments, the distance D2 between the supporting pins 160 on both sides of the display panel 200 is much greater than the distance D1 between one of the supporting pins 160 and the edge of the active region 201 of the display panel 200. In this way, the supporting pins 160 can effectively support the edge of the diffusion plate 140.

Figure 6:
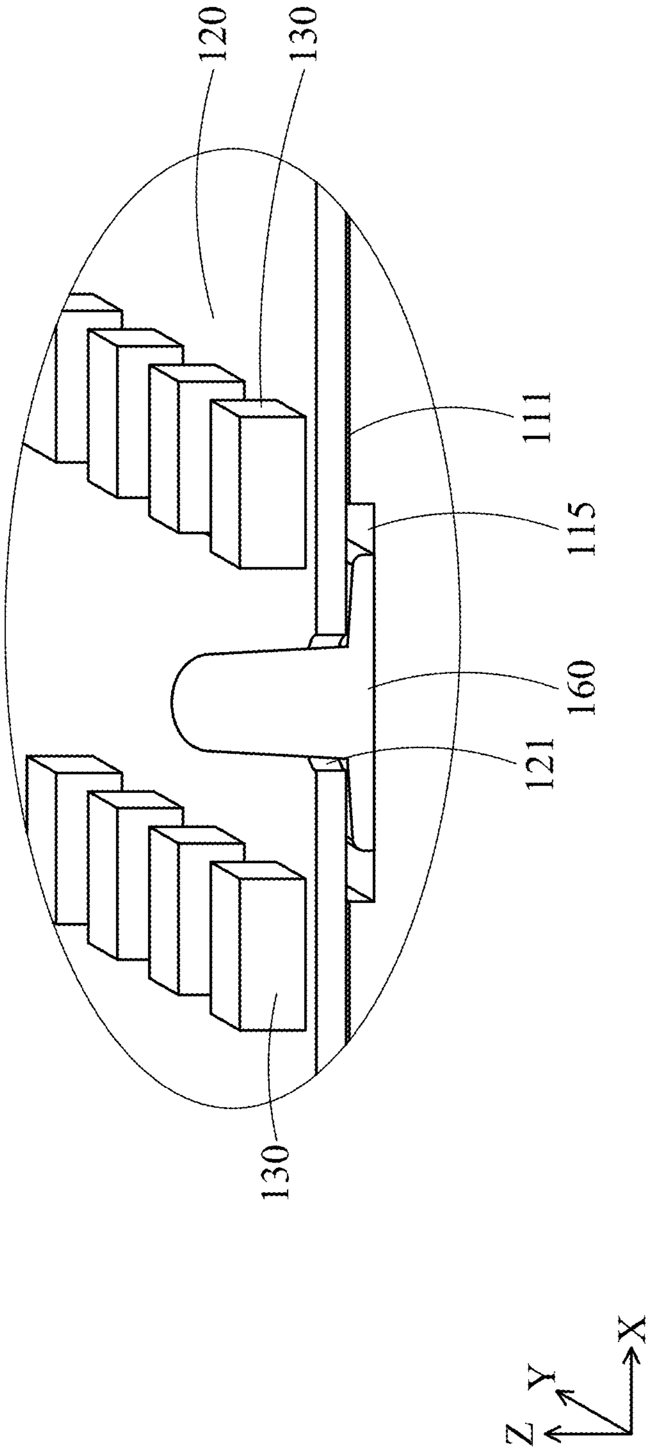
FIG. 6 shows a partial cross-sectional view of the display device in accordance with some embodiments of the present disclosure.

FIG. 6 shows a partial cross-sectional view of the display device 10 in accordance with some embodiments of the present disclosure. As shown in FIG. 6, the supporting pin 160 can be received in the groove 115 of the back plate 110. In some embodiments, the groove 115 may be recessed from the bottom surface 111 of the back plate 110. The supporting pin 160 may be disposed in the groove 115 and pass through the hole 121 of the circuit substrate 120. Specifically, the supporting pin 160 can be disposed in the groove 115 first, and then the circuit substrate 120 is disposed on the back plate 110 and the supporting pin 160. In this way, the risk of the supporting pin 160 interfering with the light-emitting elements 130 can be reduced, or the risk of the supporting pin 160 being displaced and failed can be reduced.

Figure 7:
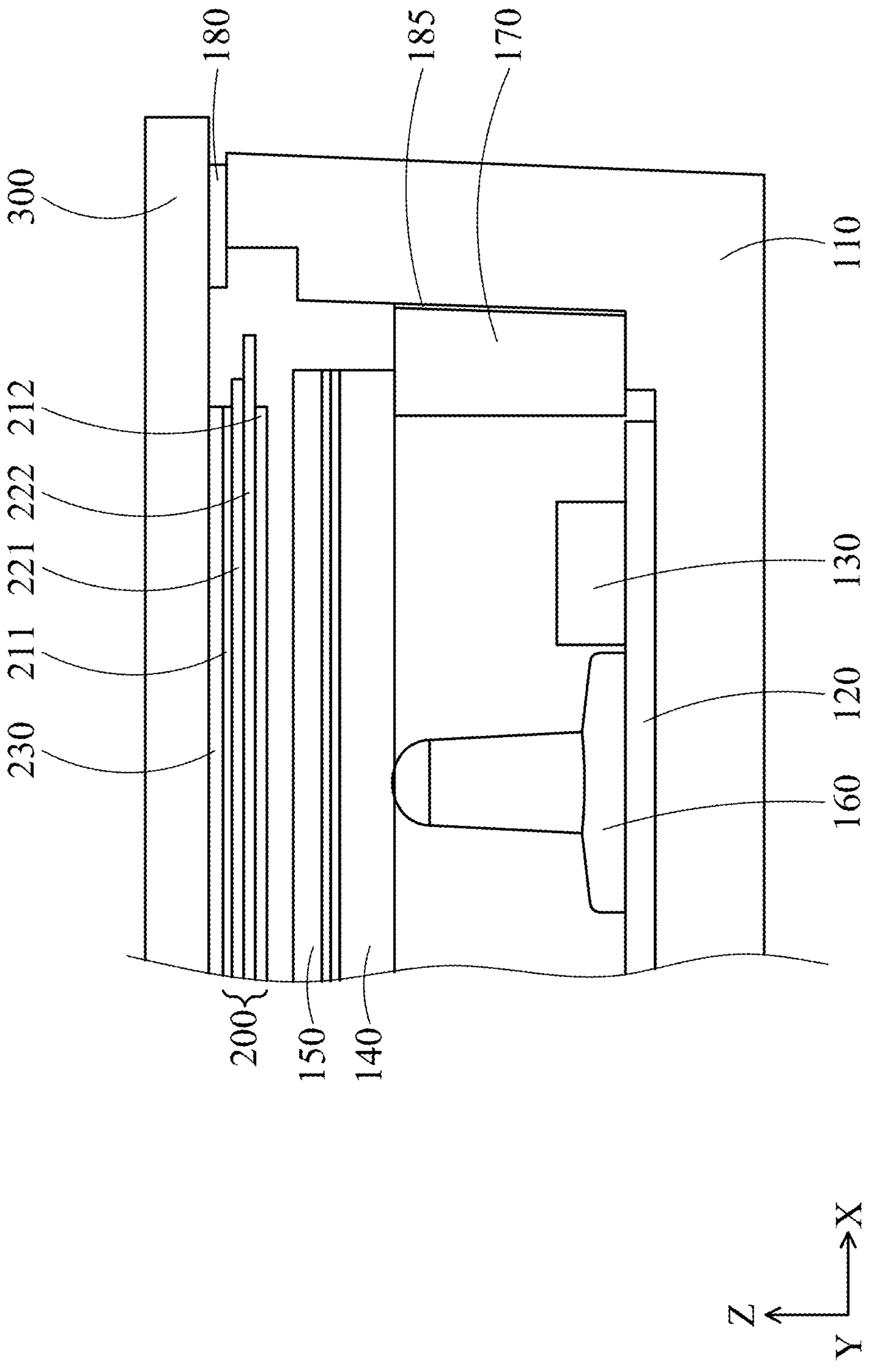
FIG. 7 shows a partial cross-sectional view of the display device in accordance with some embodiments of the present disclosure.

FIG. 7 shows a partial cross-sectional view of the display device 10 in accordance with some embodiments of the present disclosure. For example, FIG. 7 may be illustrated along the line B-B shown in FIG. 1, but the present disclosure is not limited thereto. As shown in FIG. 7, the supporting member 170 can be bonded to the sidewall of the back plate 110 via the adhesive 185, and can be used to support the edge of the diffusion plate 140 and the optical film 150. In some embodiments, in the normal direction (for example, parallel to the Z-axis) of the display device 10, the supporting member 170 can overlap with the edges of the diffusion plate 140 and the optical film 150, thereby blocking the light emitted beside the diffusion plate 140. As a result, the risk of mura issues in the display device 10 may be reduced. In some embodiments, the supporting pins 160 and/or the supporting members 170 may be in contact with the diffusion plate 140, but the present disclosure is not limited thereto. In some embodiments, the distance between the supporting pin 160 (or the supporting member 170) and the diffusion plate 140 is greater than or equal to 0 millimeters and less than or equal to 0.3 millimeters in the normal direction (such as the vertical direction) of the diffusion plate 140. In this way, the risk of the diffusion plate 140 and the optical film 150 falling can be reduced. For example, the structure of this embodiment can be applied to the left and right sides of the display device 10, but the present disclosure is not limited thereto. In some embodiments, in a cross-sectional view, in the extending direction (such as the horizontal direction) of the diffusion plate 140, the overlapping width of the supporting member 170 and the diffusion plate 140 is less than or equal to 0.2 mm and greater than or equal to 0.01 mm. In some embodiments, the corner of the supporting member 170 close to the diffusion plate 140 may have a curved structure or a chamfer structure. Specifically, the diffusion plate 140 may shrink at a temperature lower than room temperature, causing the diffusion plate 140 to separate from the supporting member 170. Otherwise, the diffusion plate 140 may expand when returning to a temperature higher than room temperature, so that the diffusion plate 140 is supported by the supporting member 170 again.

The configuration of the arc-angled structure 174 may facilitate that the diffusion plate 140 returns to the top of the supporting member 170 with sufficient support.

Figure 8:
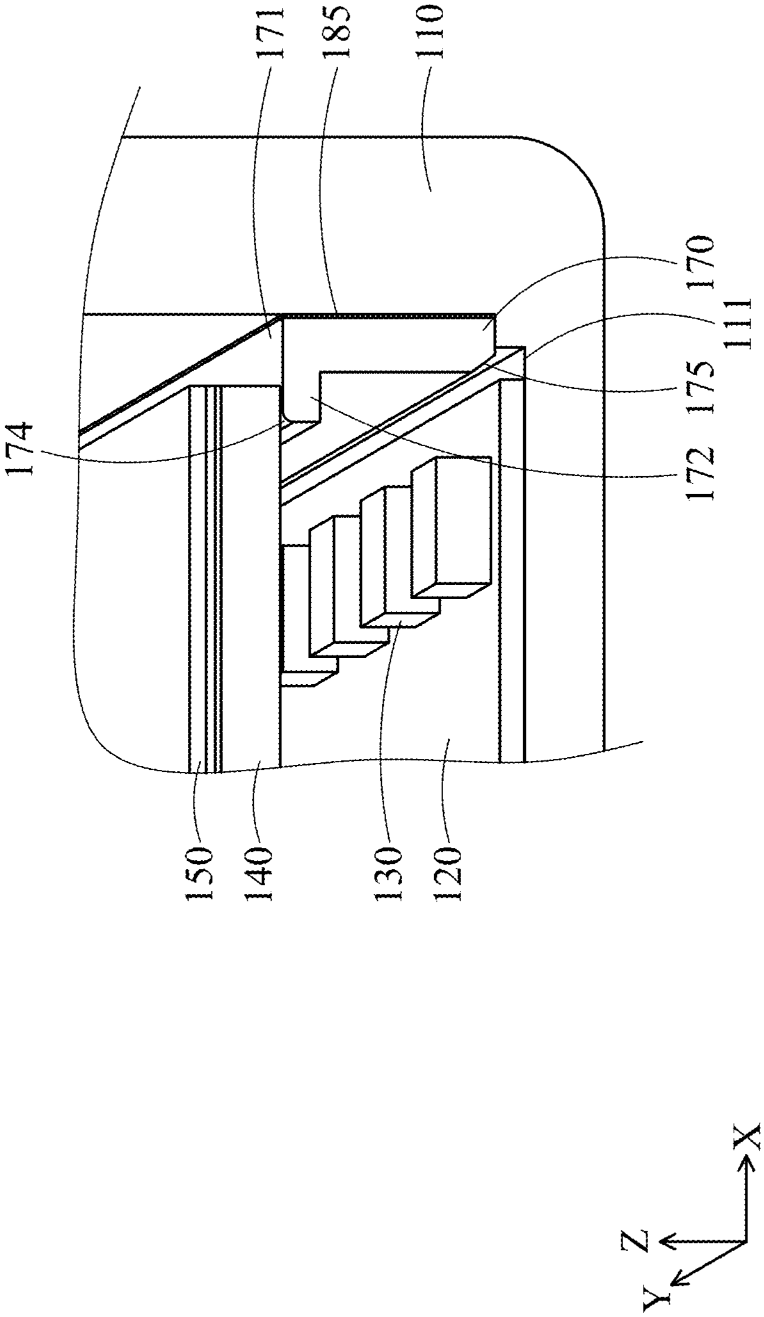
FIG. 8 shows a partial perspective view of the display device in accordance with some embodiments of the present disclosure.

FIG. 8 shows a partial perspective view of the display device 10 in accordance with some embodiments of the present disclosure. For example, FIG. 8 may be illustrated along the line B-B shown in FIG. 1, but the present disclosure is not limited thereto. In this embodiment, the supporting pin 160 may be omitted, but the present disclosure is not limited thereto. As shown in FIG. 8, the supporting member 170 may have an extending portion 172 extending toward the edges of the diffusion plate 140 and the optical film 150. In some embodiments, the extending portion 172 may extend from the top surface 171 of the supporting member 170, but the present disclosure is not limited thereto. In some embodiments, the extending portion 172 may be formed with an arc-angled structure 174 corresponding to the bottom surface of the diffusion plate 140. Specifically, the diffusion plate 140 may shrink at a temperature lower than room temperature, causing the diffusion plate 140 to separate from the supporting member 170. Otherwise, the diffusion plate 140 may expand when returning to a temperature higher than room temperature, so that the diffusion plate 140 is supported by the supporting member 170 again. Through the configuration of the arc-angle structure 174, the diffusion plate 140 can be facilitated to return to the top of the supporting member 170 with sufficient support.

In some embodiments, the supporting member 170 may have a chamfer structure 175 that faces the circuit substrate 120. In some embodiments, the supporting member 170 can be separated from the circuit substrate 120 (that is, there is a gap between the supporting member 170 and the circuit substrate 120), thereby reducing the risk of interference between the supporting member 170 and the circuit substrate 120. However, the present disclosure is not limited thereto. For example, the gap formed between the supporting member 170 and the circuit substrate 120 may be between 0 (that is, the supporting member 170 may be in contact with the circuit substrate 120) to about 0.3 mm. It should be understood that the above-mentioned arc-angled structure 174 and/or chamfer structure 175 are merely examples, and those skilled in the art can replace the above-mentioned structures with arc-angles and/or chamfers based on the contents of the present disclosure. For example, the structure of this embodiment can be applied to the left and right sides of the display device 10, but the present disclosure is not limited thereto.

Figure 9:
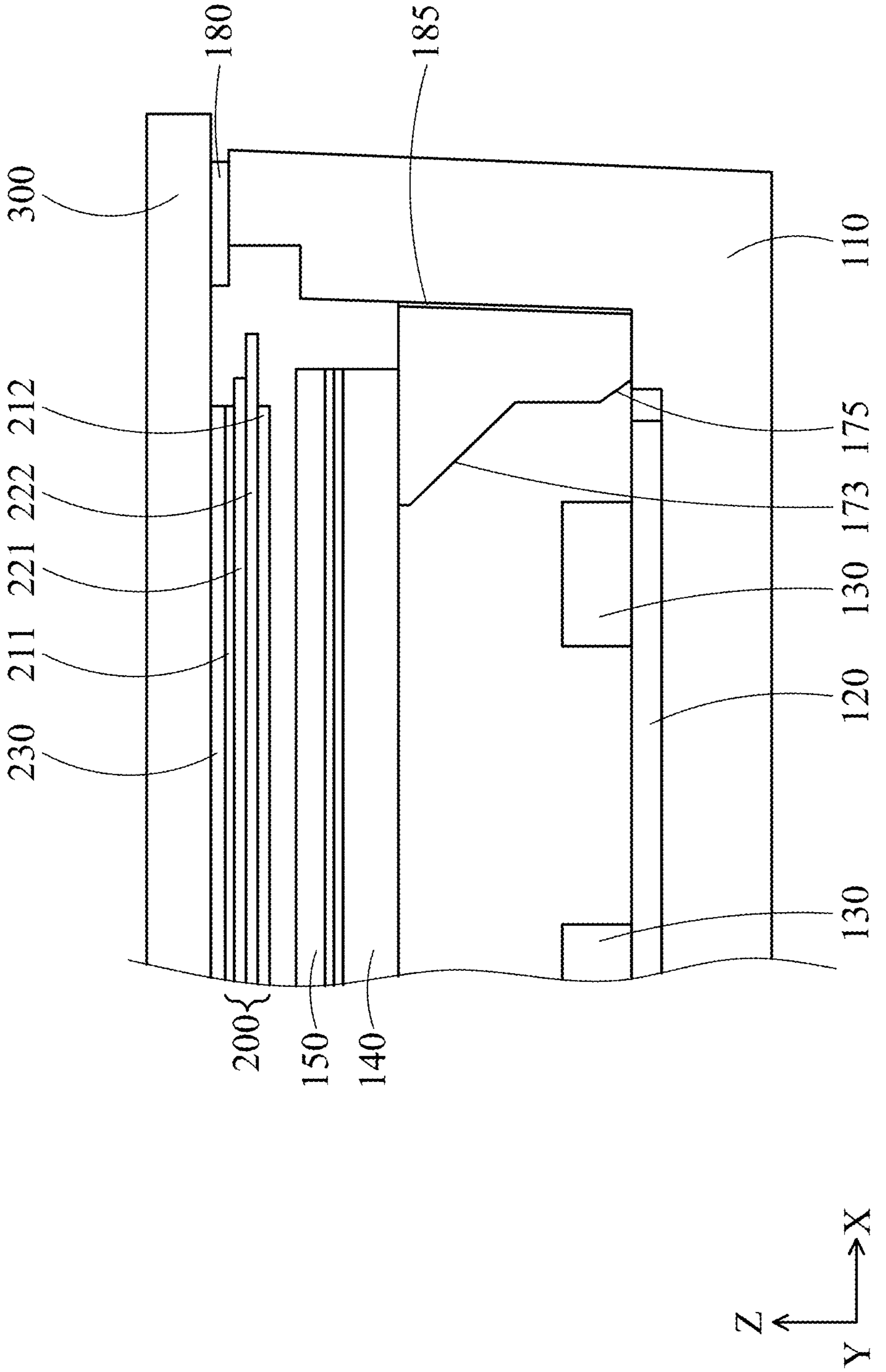
FIG. 9 shows a partial cross-sectional view of the display device in accordance with some embodiments of the present disclosure.

FIG. 9 shows a partial cross-sectional view of the display device 10 in accordance with some embodiments of the present disclosure. For example, FIG. 9 may be illustrated along the line B-B shown in FIG. 1, but the present disclosure is not limited thereto. As shown in FIG. 9, the supporting member 170 may have a supporting portion 173 that extends toward the edges of the diffusion plate 140 and the optical film 150. In some embodiments, the supporting portion 173 partially overlaps the active region 201. In some embodiments, the supporting portion 173 may extend from the top surface 171 of the supporting member 170, but the present disclosure is not limited thereto. For example, the structure of this embodiment can be applied to the left and right sides of the display device 10, but the present disclosure is not limited thereto.

Figure 10:
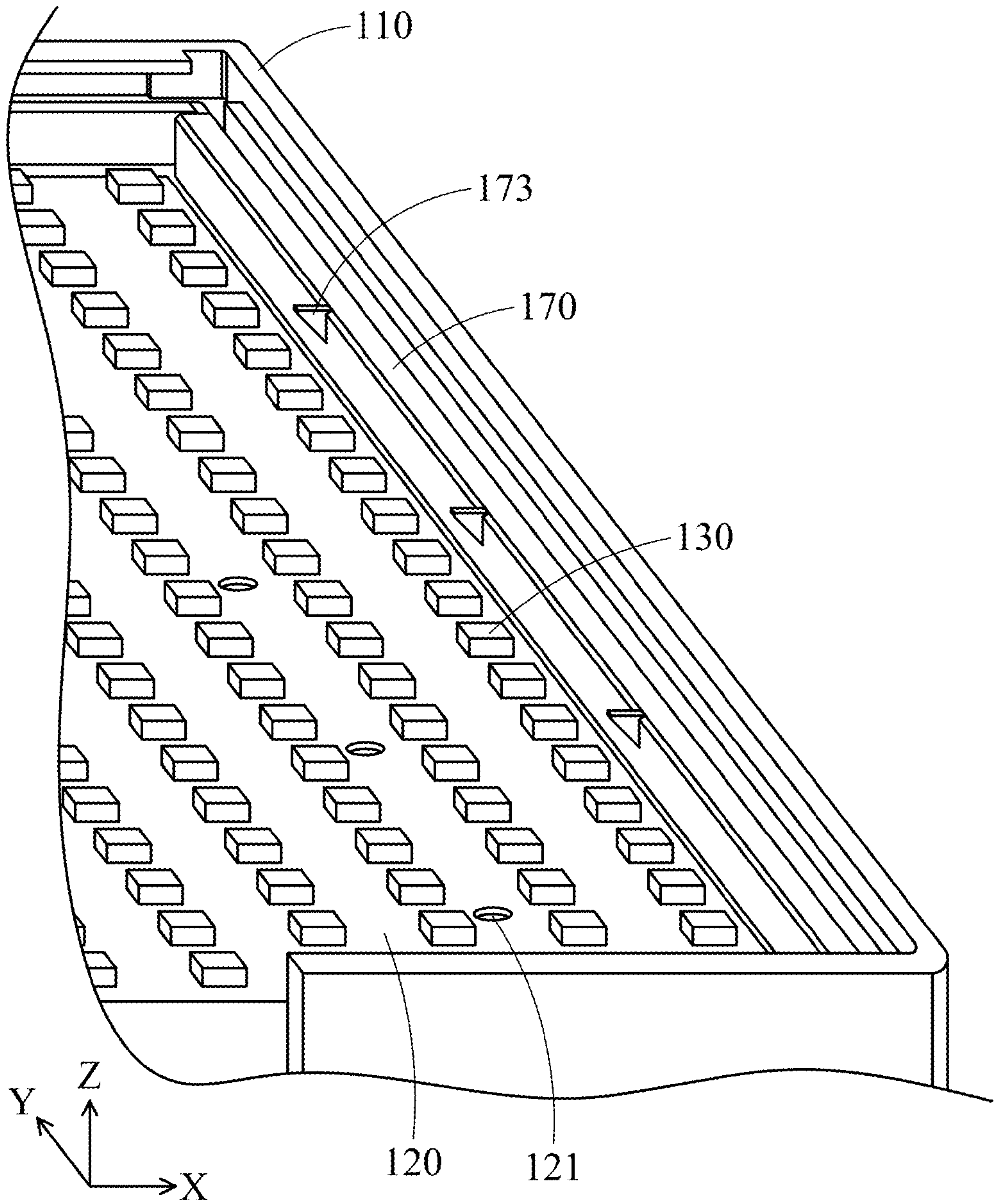
FIG. 10 shows a schematic perspective view of the display device in accordance with some embodiments of the present disclosure.
Figure 11:
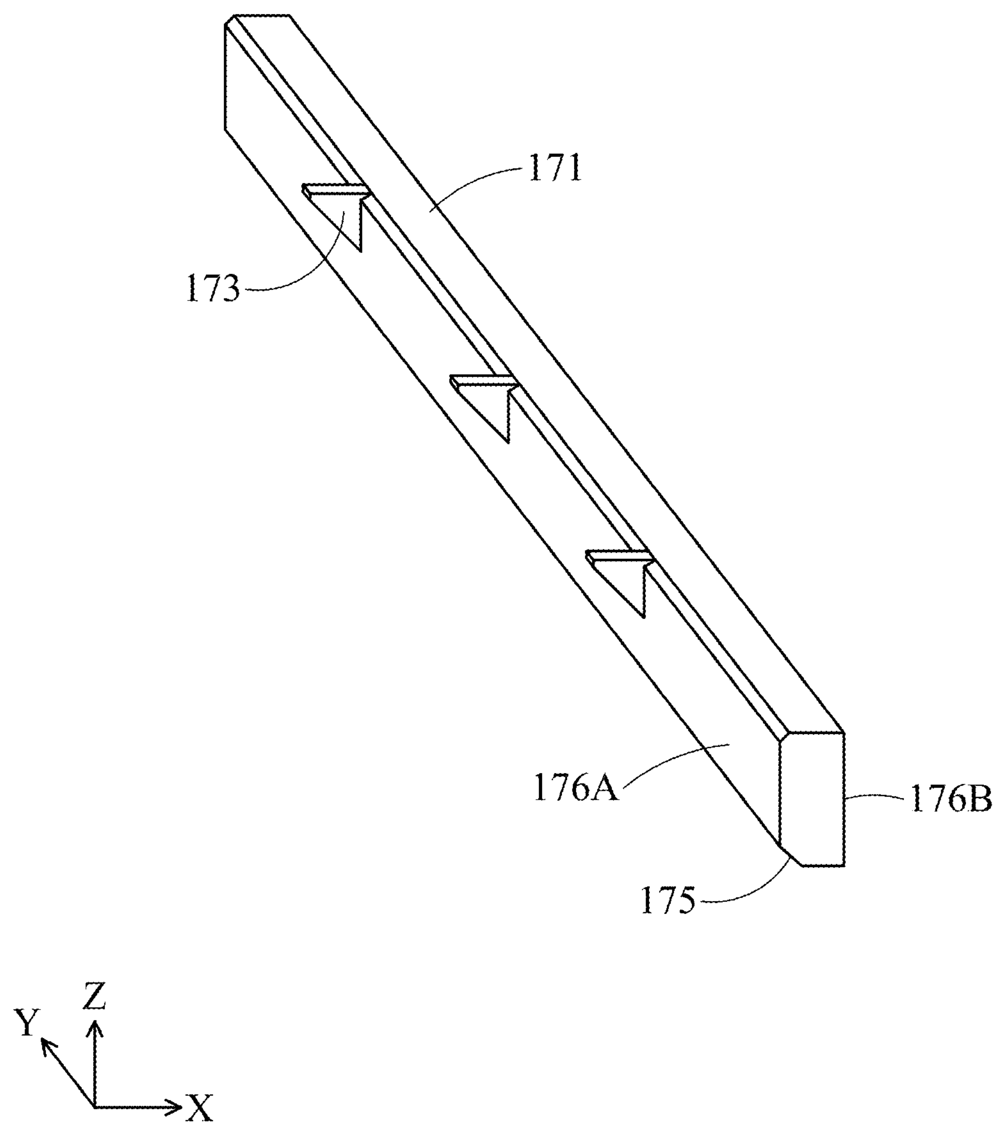
FIG. 11 shows a perspective view of the supporting member in accordance with some embodiments of the present disclosure.

FIG. 10 shows a partial perspective view of the display device 10 in accordance with some embodiments of the present disclosure. FIG. 11 shows a perspective view of the supporting member 170 in accordance with some embodiments of the present disclosure. As shown in FIGS. 10 and 11, the supporting member 170 may have a plurality of supporting portions 173 that extend toward the edges of the diffusion plate 140 and the optical film 150 for supporting the diffusion plate 140 and the optical film 150. In this way, the risk of the diffusion plate 140 and the optical film 150 falling can be reduced. Specifically, the supporting portion 170 may have opposite sidewalls 176A and 176B. The supporting portions 173 may protrude from the sidewall 176A, and the sidewall 176B of the supporting member 170 may be attached to the back plate 110 via the adhesive 185 (as shown in FIG. 9). In some embodiments, the length by which the supporting portions 173 protrudes from the sidewall 176A may be in a range from about 1 mm to about 5 mm, but the present disclosure is not limited thereto. In some embodiments, the spacing between adjacent supporting portions 173 may be in a range from about 10 mm to about 150 mm (such as about 50 mm), but the present disclosure is not limited thereto. In some embodiments, the thickness of the supporting portions 173 may be less than about 3 millimeters. In the normal direction of the display device 10 (for example, parallel to the Z-axis), the supporting portions 173 and the light-emitting elements 130 do not overlap. For example, the supporting portions 173 may be located between adjacent light emitting elements 130. In this way, the risk of the supporting portions 173 blocking the light emitted by the light-emitting elements 130 can be reduced. In some embodiments, the supporting portions 173 may have a triangular cross-section on a plane (for example, parallel to the X-Z plane), but the present disclosure is not limited thereto. Any regular or irregular shape or size of the supporting portions 173 is included within the scope of the present disclosure. For example, the structure of this embodiment can be applied to the left and right sides of the display device 10, but the present disclosure is not limited thereto.

Figure 12:
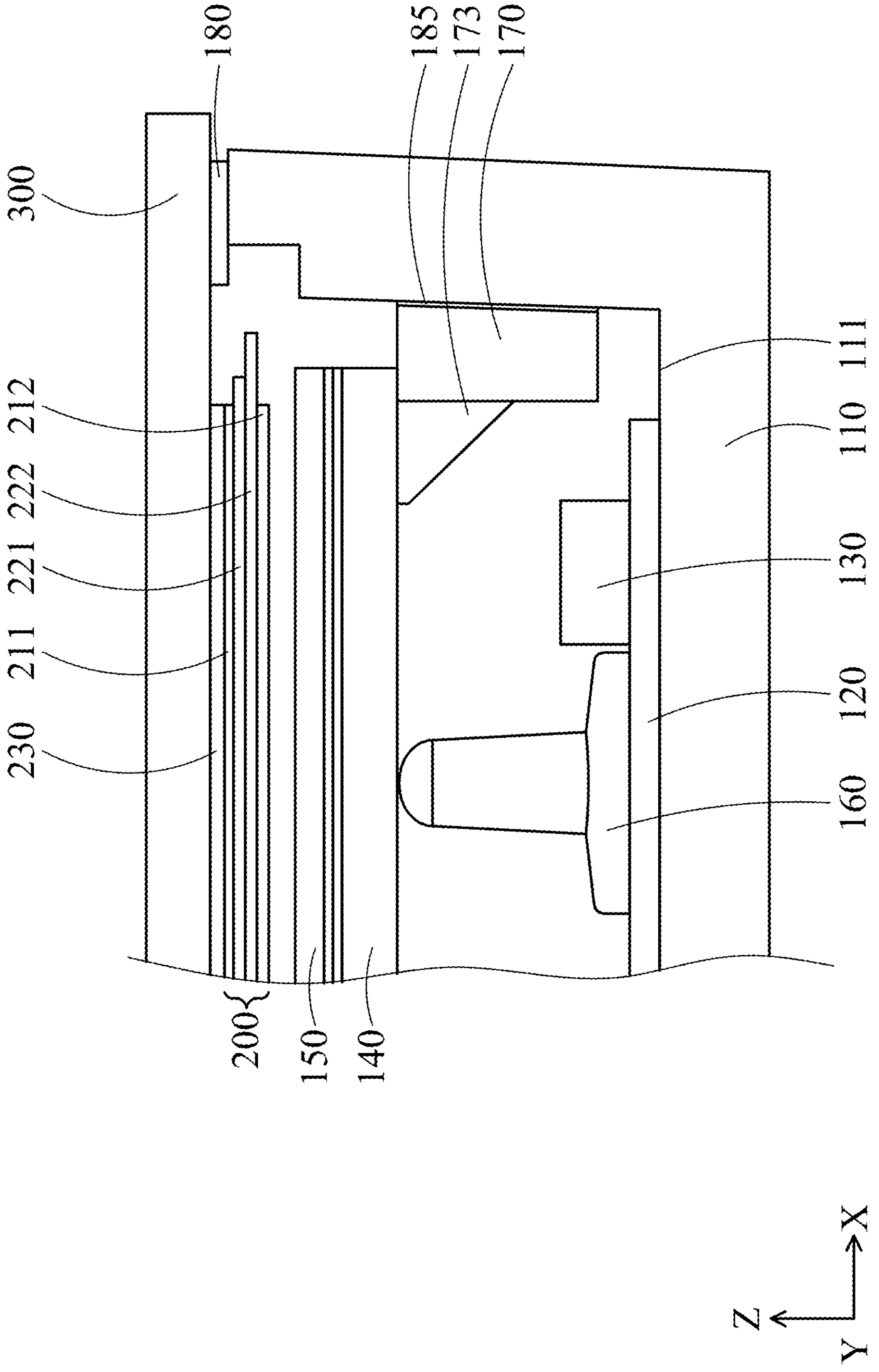
FIG. 12 shows a partial cross-sectional view of the display device in accordance with some embodiments of the present disclosure

FIG. 12 shows a partial cross-sectional view of the display device 10 in accordance with some embodiments of the present disclosure. For example, FIG. 12 may be illustrated along the line B-B shown in FIG. 1, but the present disclosure is not limited thereto. As shown in FIG. 12, the supporting member 170 having the support portion 173 and the supporting pin 160 can be disposed together. In this way, the support for the diffusion plate 140 and the optical film 150 can be further strengthened. In some embodiments, the diffusion plate 140 may be in contact with at least one of the supporting member 170 and the supporting pin 160, but the present disclosure is not limited thereto. In some embodiments, the diffusion plate 140 may be separated from the supporting member 170 and the supporting pin 160. For example, the structure of this embodiment can be applied to the left and right sides of the display device 10, but the present disclosure is not limited thereto.

Please referring to FIG. 1, it should be noted that each edge of the display device 10 (for example, shown by the lines A-A and B-B) can be any of the structures shown in the above-mentioned FIG. 3 to FIG. 12. Therefore, the description will not be repeated below.

It should be understood that although the above embodiments merely illustrate part of the configuration of the display device, those skilled in the art should be able to add other optical layers and/or light-emitting elements to the structures herein based on the teachings of the present disclosure for the purpose of enhancing the display and/or touch effects. These configurations derived from the present disclosure are also included within the scope of the present disclosure. In addition, the present disclosure also provides several different display devices. Those skilled in the art should be able to arbitrarily combine/arrange these display devices without violating the teachings of the present disclosure, and these arrangements and combinations are all included within the scope of the present disclosure.

As set forth above, the embodiments of the present disclosure provide a display device including supporting pins or supporting members. Specifically, the backlight module may include supporting pins or supporting members for supporting the diffusion plate and the optical film. In this way, the risk of the diffusion plate and optical film falling can be reduced, thereby improving the reliability of the display device. In addition, the supporting pins may be disposed in the grooves of the back plate and pass through the holes of the circuit substrate, thereby reducing the risk of the supporting pins interfering with the light-emitting elements or reducing the risk of the supporting pins being displaced and failed. In some embodiments, the supporting members can overlap the edges of the diffusion plate and the optical film, thereby blocking light emitted beside the diffusion plate, reducing the risk of mura issues in the display device. In addition, the supporting members may have a supporting portion or an extending portion extending toward the edges of the diffusion plate and the optical film so as to provide support for the diffusion plate and the optical film.

While the embodiments and the advantages of the present disclosure have been described above, it should be understood that those skilled in the art may make various changes, substitutions, and alterations to the present disclosure without departing from the spirit and scope of the present disclosure. It should be noted that different embodiments may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A display device, comprising:
a display panel; and
a backlight module providing a light source for the display panel, wherein the backlight module comprises:
a back plate having a bottom surface and a sidewall perpendicular to the bottom surface;
a plurality of light-emitting elements disposed over the bottom surface of the back plate;
an optical film disposed between the plurality of light-emitting elements and the display panel;
a supporting member bonded to the sidewall of the back plate; and
a diffusion plate disposed over the supporting member, wherein in a cross-sectional view, in an extending direction of the diffusion plate, an overlapping width of the supporting member and the diffusion plate is less than or equal to 0.2 mm, and greater than or equal to 0.01 mm.

2. The display device as claimed in claim 1, wherein in a normal direction of the diffusion plate, a distance between the supporting member and the diffusion plate is greater than or equal to 0, and less than or equal to 0.3 mm.

3. The display device as claimed in claim 1, wherein the supporting member has an arc-angled structure or a chamfer structure facing the diffusion plate.

4. The display device as claimed in claim 1, wherein the display panel has an active region, the supporting member has a plurality of supporting portions parallel to each other, and the plurality of supporting portions partially overlaps the active region.

5. The display device as claimed in claim 4, wherein one of the plurality of supporting portions is located between adjacent light-emitting elements.

6. The display device as claimed in claim 4, wherein the supporting portions extend from a top surface of the supporting member.

7. The display device as claimed in claim 1, wherein the supporting member is made of light-shielding material.

8. The display device as claimed in claim 1, wherein the supporting member is bonded to the sidewall via an adhesive.

9. The display device as claimed in claim 1, comprising a circuit substrate disposed on the back plate, wherein the supporting member is separated from the circuit substrate.

* * * * *